US008755970B2

(12) United States Patent
Koumura

(10) Patent No.: US 8,755,970 B2
(45) Date of Patent: Jun. 17, 2014

(54) VEHICLE CONTROL DEVICE

(75) Inventor: Shingo Koumura, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 114 days.

(21) Appl. No.: 13/515,174

(22) PCT Filed: Dec. 11, 2009

(86) PCT No.: PCT/JP2009/006823
§ 371 (c)(1),
(2), (4) Date: Jun. 11, 2012

(87) PCT Pub. No.: WO2011/070634
PCT Pub. Date: Jun. 16, 2011

(65) Prior Publication Data
US 2012/0290171 A1 Nov. 15, 2012

(51) Int. Cl.
*B60G 17/018* (2006.01)
(52) U.S. Cl.
USPC .......................................................... 701/37
(58) Field of Classification Search
CPC ......... G06F 11/30; G06F 17/00; B60W 20/00
USPC ................................ 701/36, 37, 38, 41, 48, 91
See application file for complete search history.

(56) References Cited

U.S. PATENT DOCUMENTS

| 4,744,589 | A | 5/1988 | Buma et al. |
| 5,075,855 | A | 12/1991 | Sugasawa et al. |
| 2005/0049761 | A1* | 3/2005 | Kataoka et al. ................... 701/1 |
| 2008/0249690 | A1* | 10/2008 | Matsumoto et al. ............ 701/48 |

FOREIGN PATENT DOCUMENTS

| JP | 1 56921 | 12/1989 |
| JP | 06 122309 | 5/1994 |
| JP | 6 51444 | 7/1994 |
| JP | 2007 203983 | 8/2007 |
| JP | 2008 068763 | 3/2008 |
| JP | 2009 120162 | 6/2009 |
| JP | 2009 137545 | 6/2009 |

OTHER PUBLICATIONS

International Search Report issued on Mar. 23, 2010 in PCT/JP09/006823 filed on Dec. 11, 2009.

* cited by examiner

*Primary Examiner* — Kim T Nguyen
(74) *Attorney, Agent, or Firm* — Oblon, Spivak, McClelland, Maier & Neustadt, L.L.P.

(57) ABSTRACT

To provide a vehicle control device capable of improving the ride comfort on the vehicle. A vehicle control device for controlling operation of a vehicle including a vehicle body, and a tire for supporting the vehicle body and contacting with a ground surface, the vehicle control device includes an operation condition detecting unit configured to detect an operation condition that influences a side vibration of the vehicle body; a suspension geometry adjusting unit configured to adjust a suspension geometry of the vehicle; and a control unit configured to control operation of the suspension geometry adjusting unit based on a detection result of the operation condition detecting unit.

12 Claims, 11 Drawing Sheets

VEHICLE CONTROL DEVICE

FIELD

The present invention relates to vehicles, in particular, to a vehicle control device for controlling behavior of a vehicle body.

BACKGROUND

In vehicles such as an automobile, unsprung vibration occurs during traveling and a so-called throbbing vibration occurs. As a device for suppressing the throbbing vibration, a specific damping coefficient Ct at which a sum of vectors of sprung vertical acceleration and sprung longitudinal acceleration becomes a minimum is calculated and stored in advance from a relationship of the damping coefficient of a shock absorber and the sprung vertical acceleration and a relationship of the damping coefficient of the shock absorber and the sprung longitudinal acceleration, according to Patent Literature 1. There is described an damping force control device for setting the damping coefficient of the shock absorber at a specific damping coefficient Ct when the vibration of a unsprung resonance frequency band becomes greater than a threshold value.

CITATION LIST

Patent Literature

Patent Literature 1: Japanese Patent Application Laid-open No. 2009-137545

SUMMARY

Technical Problem

In Patent Literature 1, the vibration in the longitudinal direction (direction parallel to travelling direction) can be suppressed in addition to the vertical vibration. However, the vibration also occurs in the side direction (direction orthogonal to travelling direction). A problem in that the ride comfort also degrades when the vibration in the side direction occurs arises.

In light of the foregoing, it is an object of the present invention to provide a vehicle control device capable of improving the ride comfort on the vehicle.

Solution to Problem

In order to solve the above mentioned problem and achieve the object, a vehicle control device according to the present invention for controlling operation of a vehicle including a vehicle body, and a tire for supporting the vehicle body and contacting with a ground surface, the vehicle control device includes an operation condition detecting means configured to detect an operation condition that influences a side vibration of the vehicle body; a suspension geometry adjusting means configured to adjust a suspension geometry of the vehicle; and a control means configured to control operation of the suspension geometry adjusting means based on a detection result of the operation condition detecting means.

Here, it is preferable that the suspension geometry adjusting means is a vehicle height adjusting means configured to adjust a height between the vehicle body and a tire.

Further, it is preferable that the control means stores a relationship of a control amount of the suspension geometry calculated in advance and a detection result, and calculates the control amount based on the relationship and the detection result.

Here, it is preferable that the control means stores a condition of the suspension geometry of the vehicle body that cancels out a force in a side direction applied on a center of gravity of the vehicle body tire and a force in a side direction applied on a contact point with the ground surface of the tire for every operation condition; and the operation of the suspension geometry adjusting means is preferably controlled to obtain the condition of the suspension geometry of the vehicle body that cancels out the force in the side direction applied on the center of gravity of the vehicle body tire and the force in the side direction applied on the contact point with the ground surface of the tire based on the detection result of the operation condition detecting means.

In order to solve the above mentioned problem and achieve the object, a vehicle control device according to the present invention for controlling operation of a vehicle including a vehicle body, and a tire for supporting the vehicle body and contacting with a ground surface, the vehicle control device includes an operation condition detecting means configured to detect an operation condition that influences side vibration of the vehicle body; a steering gear ratio adjusting means configured to adjust a steering gear ratio of the vehicle; and a control means configured to control operation of the steering gear ratio adjusting means based on a detection result of the operation condition detecting means.

Here, it is preferable that the control means stores a relationship of a control amount of the steering gear ratio calculated in advance and a detection result, and calculates the control amount based on the relationship and the detection result.

Further, it is preferable that the control means stores a condition of the steering gear ratio that cancels out a force in a side direction applied on a center of gravity of the vehicle body tire and a force in a side direction applied on a contact point with the ground surface of the tire for every operation condition; and the operation of the steering gear ratio adjusting means is preferably controlled to obtain the steering gear ratio of the vehicle body that cancels out the force in the side direction applied on the center of gravity of the vehicle body tire and the force in the side direction applied on the contact point with the ground surface of the tire based on the detection result of the operation condition detecting means.

Further, it is preferable that the operation condition detecting means is a means configured to detect a vehicle speed.

Further, it is preferable that the operation condition detecting means is a means configured to detect a resonance frequency in an vertical direction.

Further, it is preferable that the operation condition detecting means is a means configured to detect a state of a road surface on which to travel.

Further, it is preferable that the side vibration of the vehicle body is a vibration that occurs from a force acting on the tire from the road surface.

Advantageous Effects of Invention

The vehicle control device according to the present invention has effects of being able to suppress the vibration of the vehicle body and improve the ride comfort.

DESCRIPTION OF EMBODIMENTS

Hereinafter, embodiments will be described in detail based on the drawings for a vehicle control device according to the present invention. It should be recognized that the present invention is not limited by such embodiments.

First Embodiment

Figure 1:
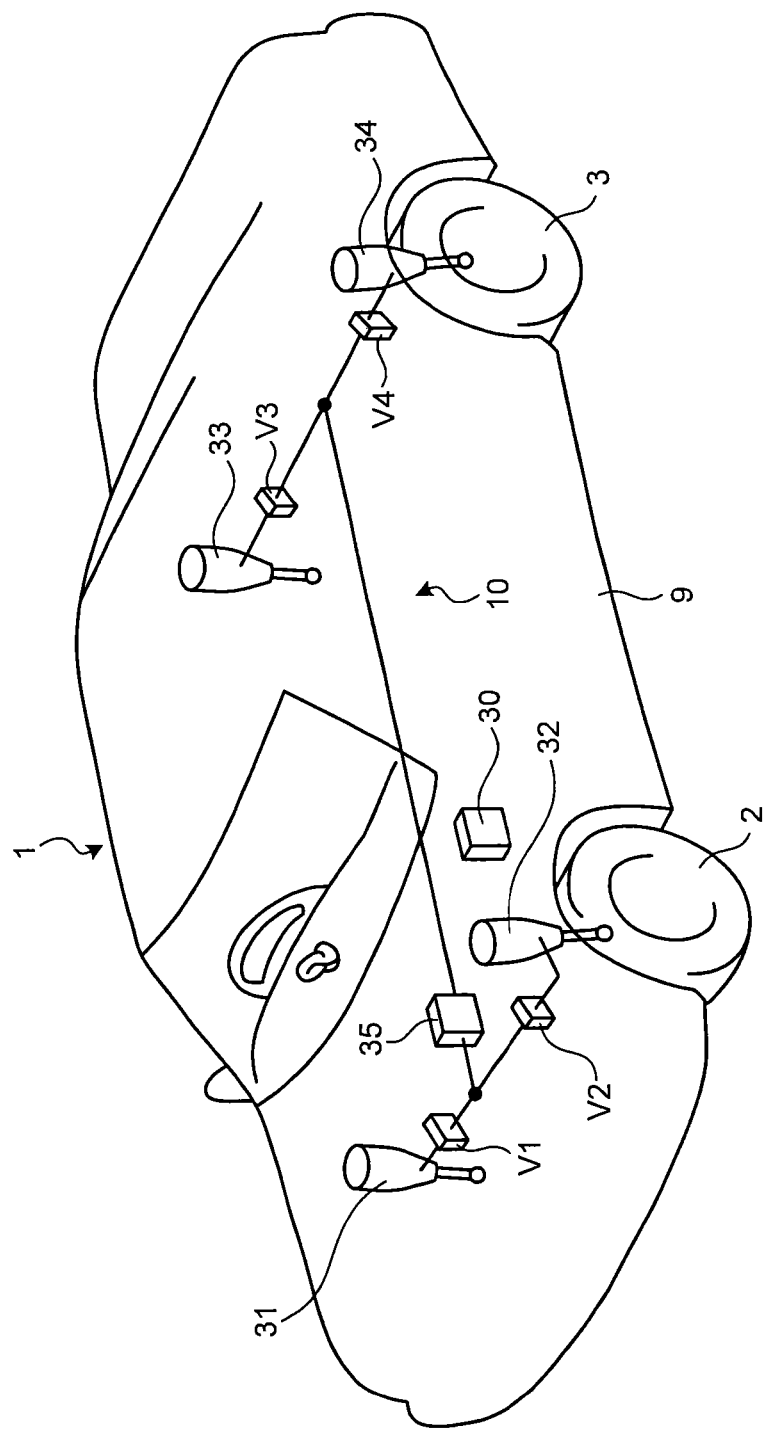
FIG. 1 is a perspective view illustrating a schematic configuration of one embodiment of a vehicle including a vehicle control device.
Figure 2:
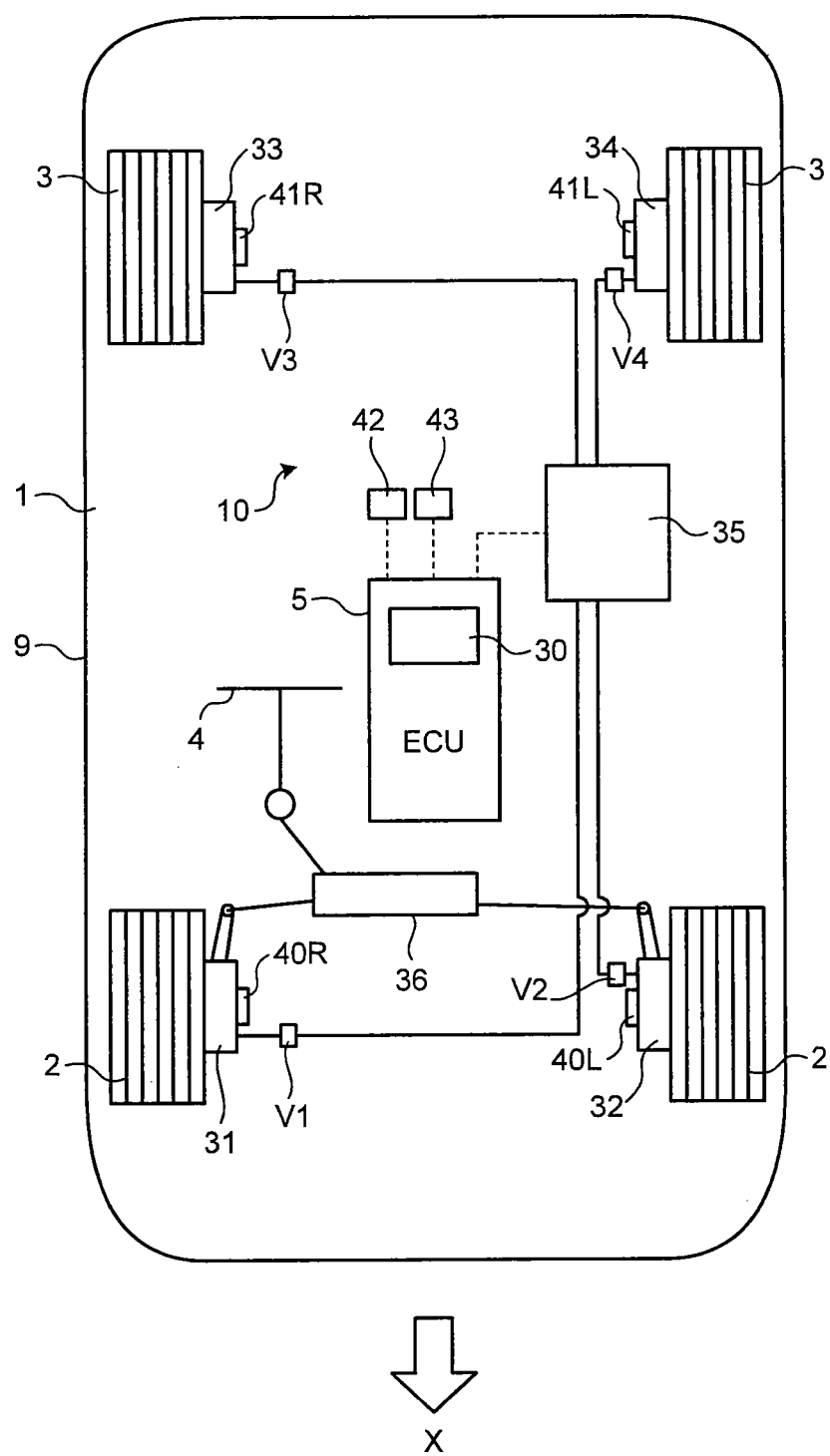
FIG. 2 is a plan view illustrating the schematic configuration of the vehicle illustrated in FIG. 1 in more detail.

FIG. 1 is a perspective view illustrating a schematic configuration of one embodiment of a vehicle including a vehicle control device according to the present embodiment, and FIG. 2 is a plan view illustrating the schematic configuration of the vehicle illustrated in FIG. 1 in more detail. As illustrated in FIG. 1 and FIG. 2, a vehicle 1 includes two tires 2, two tires 3, a steering 4, an ECU 5, a vehicle body 9, and a vehicle control device 10. The vehicle control device 10 includes a control means 30, suspensions 31, 32, 33, 34, an air compressor 35, a steering gear ratio adjusting means (hereinafter simply referred to as "gear ratio adjusting means") 36, resolvers 40R, 40L, 41R, 41L, a vehicle speed detecting sensor 42, and a road surface state detecting sensor 43. Although the description will be omitted, the vehicle 1 includes various configuring elements necessary for the vehicle such as a drive source, a brake, an accelerator, seats, and the like, in addition to the configuring elements mentioned above.

The tire 2 refers to the two tires to become the front wheels, where one tire 2 is coupled through the suspension 31, and the other tire 2 is coupled through the suspension 32 to the vehicle body 9. The tire 3 refers to the two tires to become the back wheels, where one tire 3 is coupled through the suspension 33, and the other tire 3 is coupled through the suspension 34 to the vehicle body 9. The vehicle 1 also has at least one of the tire 2 and the tire 3 coupled to the drive source so that it can travel on the road surface by rotating the tire with the drive source.

The steering 4 is an operating section, with which the operator operates the travelling direction, where the operation of the steering 4 is transmitted to the tire 2. Specifically, when the steering 4 is rotated, an angle of the tire 2 changes thus switching the travelling direction of the vehicle 1. The vehicle 1 is a power steering mechanism in which the gear ratio adjusting means 36 is arranged between the steering 4 and the tire 2, and the force and rotation angle input from the steering 4 are amplified by the gear ratio adjusting means 36 and transmitted to the tire 2. The gear ratio adjusting means 36 will be described later.

The ECU 5 is an electronic control unit for controlling the operation of each section of the vehicle, and includes the control means 30 of the vehicle control device 10, to be described later. The ECU 5 includes a microcomputer having a CPU, a ROM, a RAM, and an input/output port device coupled to each other by a bidirectional common bus and a drive circuit of a normal form. The vehicle body 9 is a housing or a so-called body in which the operator and the passenger sit, and is supported by the tires 2, 3 by way of the suspensions 31, 32, 33, 34 of the vehicle control means 10.

Each section configuring the vehicle control device 10 will now be described. The control means 30 is incorporated in the ECU 5, and controls the operations of the suspensions 31, 32, 33, 34, the air compressor 35, and the gear ratio adjusting means 36 based on detection results of the resolvers 40R, 40L, 41R, 41L, the vehicle speed detecting sensor 42, and the road surface state detecting sensor 43.

The suspensions 31, 32, 33, 34 have similar basic configuration other than that the arrangement position and the tire to which they are coupled are different, and hence the configuration of the suspension 31 will be described as a representative. The suspension 31 is configured by an elastic body (e.g., spring) and an damping force generating means (e.g., damper), and is attached between the tire 2 and the vehicle 9 to buffer the impact from the road surface to be input to the vehicle body 9 through the tire 2.

The air compressor 35 is connected to the suspensions 31, 32, 33, 34 to supply air into the suspensions 31, 32, 33, 34. A valve V1 is arranged on a piping connecting the air compressor 35 and the suspension 31, a valve V2 is arranged on a piping connecting the air compressor 35 and the suspension 32, a valve V3 is arranged on a piping connecting the air compressor 35 and the suspension 33, and a valve V4 is arranged on a piping connecting the air compressor 35 and the suspension 34. An air pressure to supply to the suspensions 31, 32, 33, 34 can be adjusted by adjusting the opening and closing of the valves V1, V2, V3, V4.

In the present embodiment, the suspensions 31, 32, 33, 34, the air compressor 35, and the valves V1, V2, V3, V4 configure a vehicle height adjusting means. The entire length of the suspensions 31, 32, 33, 34 can be changed to adjust the vehicle height of the vehicle body 9 by adjusting the air pressure to supply to the suspensions 31, 32, 33, 34 by the control means 30.

The gear ratio adjusting means 36 is a mechanism for adjusting the gear ratio at which the force input to the steering 4 is transmitted to the tire 2. The gear ratio adjusting means 36 uses a so-called VGRS (variable gear ratio steering) type power steering mechanism being configured by combining a motor and a decelerator and capable of linearly changing the gear ratio.

The resolvers 40R, 40L, 41R, 41L are sensors for measuring a rotation speed of the tire (wheel). The resolver 40R measures the rotation speed of one tire 2, the resolver 40L measures the rotation speed of the other tire 2, the resolver 41R measures the rotation speed of one tire 3, and the resolver 41L measures the rotation speed of the other tire 3. The resolvers 40R, 40L, 41R, 41L send the measurement results to the control means 30.

The control means 30 can detect whether the vehicle body 9 is vibrating, specifically, whether the vibration in the side direction is occurring between the vehicle body 9 and the tires 2, 3 based on the detection results of the resolvers 40R, 40L, 41R, 41L. The side direction herein is the direction parallel to a line connecting one tire 2 and the other tire 3, and is the direction parallel to the road surface and orthogonal to the travelling direction of the vehicle. The side vibration of the vehicle body is generated from the force (i.e., road surface input) acting on the tire from the road surface, and the like during travelling etc.

The control means 30 calculates a unsprung resonance frequency based on the measurement result of the rotation speed of the tire detected by the resolver. That is, the vehicle control device 10 becomes a unsprung resonance frequency detecting sensor in the combination of the resolvers 40R, 40L, 41R, 41L and the calculation function of the control means 30. The unsprung resonance frequency is the resonance frequency of the vibration generated between the tire (wheel) and the vehicle body, where the resonance frequency of the vibration in the vertical direction is detected.

The vehicle speed detecting sensor 42 is a sensor for detecting the travelling speed of the vehicle 1. The vehicle speed detecting sensor 42 may independently include a sensor for detecting the vehicle speed, but may include a sensor for detecting a travelling speed of the vehicle 1 based on detection values of the resolvers 40R, 40L, 41R, 41L. That is, the calculation device for detecting the travelling speed based on the measurement result of the resolver may be arranged as the sensor.

The road surface state detecting sensor 43 is a detecting sensor for detecting the state of the road surface on which the vehicle 1 is travelling. The road surface state detecting sensor 43 includes a sensor for determining whether raining or not. Specifically, a sensor for detecting whether a wiper is operating can be used. The road surface state detecting sensor 43 merely needs to be a sensor capable of detecting or estimating a friction coefficient of the road surface and the tire, and various types of sensors may be used. The vehicle control device 10 has the configuration described above.

Figure 3:
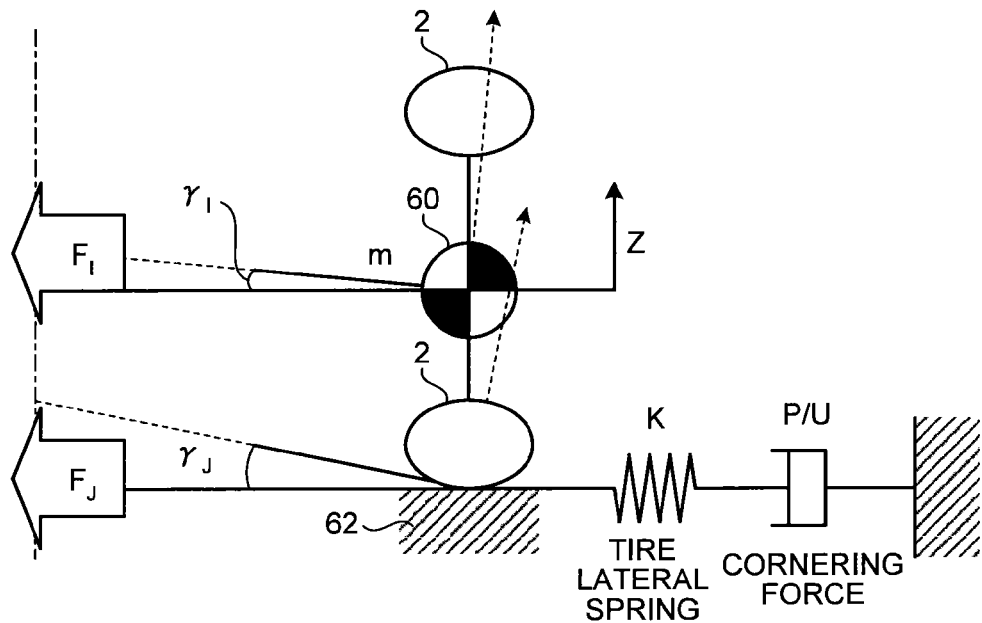
FIG. 3 is an explanatory diagram describing a force acting on a ground surface of a tire and a force acting on the center of gravity.
Figure 4:
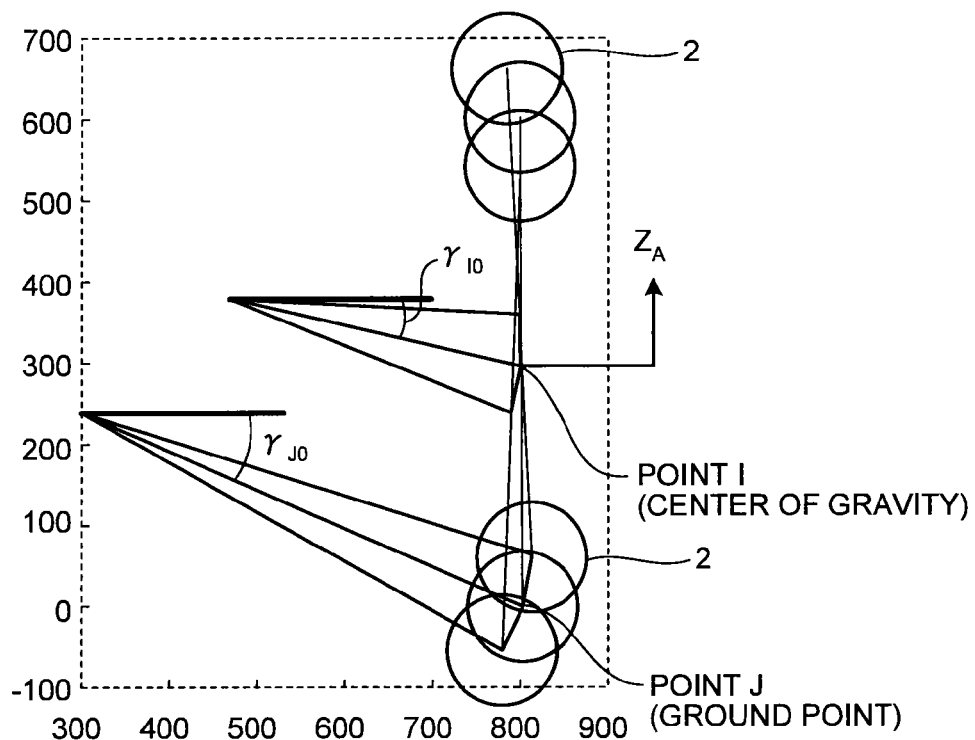
FIG. 4 is an explanatory diagram illustrating a relationship of the position and the angle of the tire.

The operation of the vehicle control device 10 will now be described. FIG. 3 is an explanatory diagram describing a force acting on a ground surface of the tire and a force acting on the center of gravity, and FIG. 4 is an explanatory diagram illustrating a relationship of the position and the angle of the tire. In FIG. 4, the horizontal axis is a length from the supporting point, and the vertical axis is a difference in height with a reference spot. The supporting point is the distance from the point at where the tire is supported. One tire 2 will be described below by way of example.

First, the force in the side direction acting on the tire 2 when the vehicle vibrates in the side direction as illustrated in FIG. 3 is modeled, where it is divided to the force that acts as the tire 2 is supported by the suspension 31 and the force that acts as the tire 2 is brought into contact with a ground surface 62.

In the present embodiment, assume the force that acts as the tire 2 is supported by the suspension 31 as force $F_I$, and the force that acts between the tire 2 and the ground surface 62 as force F. The force $F_J$ can be replaced with the force that acts on the center of gravity of the tire 2.

The force (i.e., force of inertia) proportional to the unsprung mass and the vibration acts on a center of gravity 60 (point I), and a force (frictional force) of side skidding, specifically, the side spring of the tire and the cornering force acts on the ground point (contact point, point J) with the ground surface 62. Such forces act in the direction inclined by a constant angle from the direction perpendicular to the ground surface 62. Specifically, it is inclined by an angle $\gamma_I$ at the acting point of $F_I$, and it is inclined by an angle $\gamma_J$ at the acting point of $F_J$. As illustrated in FIG. 4, the angle $\gamma_I$ and the angle $\gamma_J$ change by the vehicle height. Specifically, the angle $\gamma_I$ and the angle $\gamma_J$ become larger as the vehicle height becomes higher, that is, as the suspension extends and the spacing between the tire and the vehicle body becomes wider (move in negative direction in FIG. 4). The angle $\gamma_I$ and the angle $\gamma_J$ become smaller as the vehicle height becomes lower, that is, as the suspension contracts and the spacing between the tire and the vehicle body becomes narrower (move in positive direction in FIG. 4).

According to the above relationship, the force $F_I$ and the force $F_J$ can be expressed with the following equation 1, where m is the unsprung mass, K is the tire side spring constant, P is the cornering power, U is the vehicle speed, $\omega$ (frequency×$2\pi$) is the angular speed in the side direction, and Z is the vehicle height having the reference point as the reference.

$$F_I = -\gamma_I m\omega^2 \cdot Z \qquad (1)$$
$$F_J = \gamma_J \frac{\left(\frac{P}{U}\omega\right)^2 K}{K^2 + \left(\frac{P}{U}\omega\right)^2} Z + i\gamma_J \frac{K^2\left(\frac{P}{U}\omega\right)}{K^2 + \left(\frac{P}{U}\omega\right)^2} Z$$

Furthermore, the angle $\gamma_I$ and the angle $\gamma_J$ of the vehicle height $Z_A$ can be expressed with the following equation 2, where angle $\gamma_{I0}$ and angle $\gamma_{J0}$ are angles of a standard vehicle height.

$$\gamma_I = \gamma_{I0} - \frac{\partial \gamma_I}{\partial Z} Z_A \qquad (2)$$
$$\gamma_J = \gamma_{J0} - \frac{\partial \gamma_J}{\partial Z} Z_A$$

In equation 1, when the term of $\gamma_I$ in the equation of the force $F_I$ and the term of $\gamma_J$ in the equation of the force $F_J$ become equal in relationship, the force in the side direction that acts on the tire 2 is cancelled out, and the force that vibrates the vehicle 1 and the vehicle body 9 in the side direction can be reduced. Specifically, the vibration in the side direction can be suppressed by satisfying the relationship of the following equation 3.

$$\gamma_I m\omega^2 = \gamma_J \frac{\left(\frac{P}{U}\omega\right)^2 K}{K^2 + \left(\frac{P}{U}\omega\right)^2} \qquad (3)$$

Equation 2 may be substituted to equation 3 to obtain equation 4.

$$\left(\gamma_{I0} - \frac{\partial \gamma_I}{\partial Z} Z_A\right) m\omega^2 = \left(\gamma_{J0} - \frac{\partial \gamma_J}{\partial Z} Z_A\right) \frac{\left(\frac{P\omega}{U}\right)^2}{\left(\frac{P\omega}{U}\right)^2 + K^2} K \quad (4)$$

Equation 4 is further developed so that the left side is only $Z_A$, which becomes equation 5.

$$Z_A = \left[\gamma_{J0} \frac{\left(\frac{P\omega}{U}\right)^2}{\left(\frac{P\omega}{U}\right)^2 + K^2} K - \gamma_{I0} m\omega^2\right] \Big/ \left[\frac{\partial \gamma_J}{\partial Z} \frac{\left(\frac{P\omega}{U}\right)^2}{\left(\frac{P\omega}{U}\right)^2 + K^2} K - \frac{\partial \gamma_I}{\partial Z} m\omega^2\right] \quad (5)$$

Figure 5:
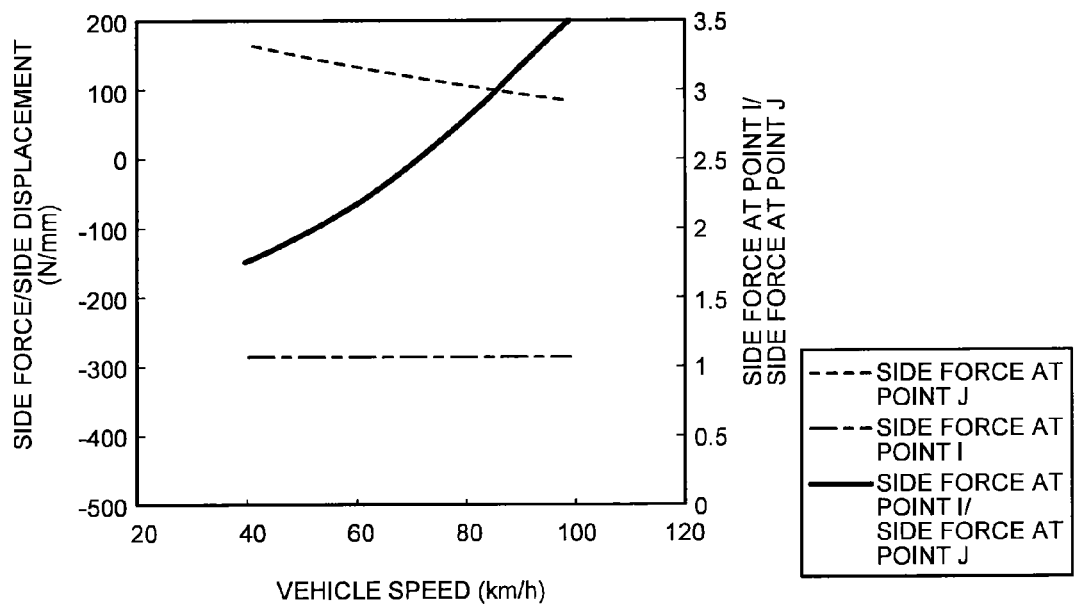
FIG. 5 is a graph illustrating a relationship of the force acting in the side direction and the vehicle speed.
Figure 6:
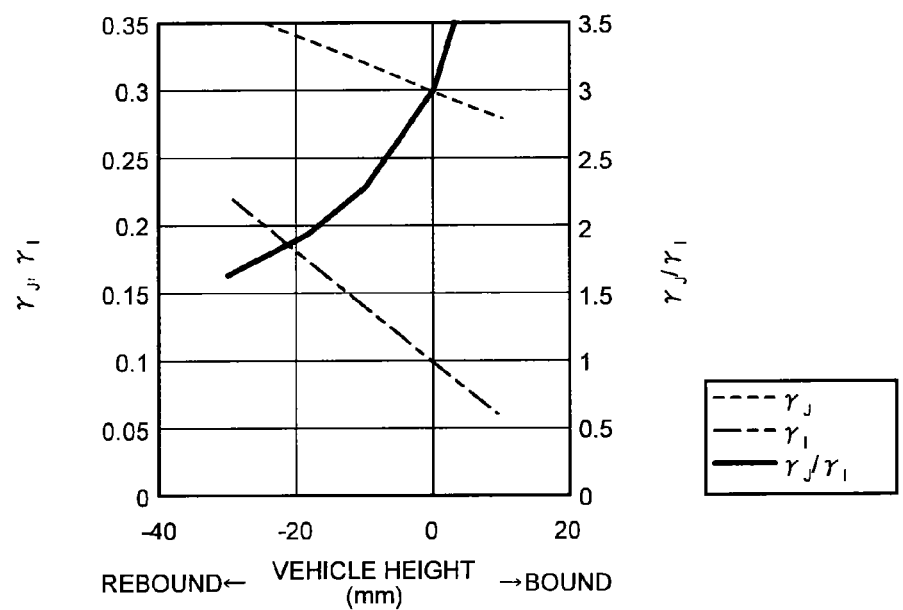
FIG. 6 is a graph illustrating a relationship of the angle and the vehicle height.
Figure 7:
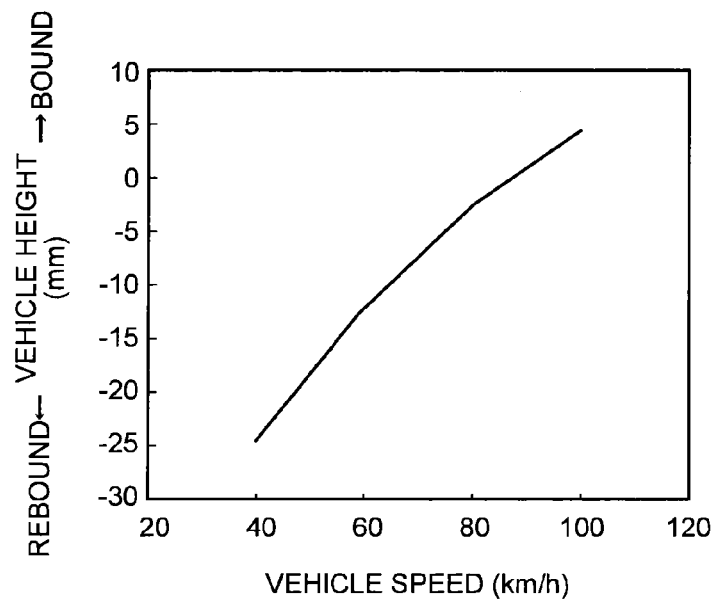
FIG. 7 is a graph illustrating a result of calculating the relationship of the vehicle height and the vehicle speed.

The vehicle control device 10 of the present embodiment controls the vehicle height $Z_A$ to satisfy equation 5 based on the detection result. One example of adjusting the vehicle height based on the detection result of the vehicle speed detecting sensor 42 will be described using FIG. 5 to FIG. 7. FIG. 5 is a graph illustrating a relationship of the force acting in the side direction and the vehicle speed, FIG. 6 is a graph illustrating a relationship of the angle and the vehicle height, and FIG. 7 is a graph illustrating a result of calculating the relationship of the vehicle height and the vehicle speed. FIG. 5 and FIG. 6 show relationships derived in advance through experiment, measurement, and calculation. The side force is the force acting in the side direction at point J and point I, and the side displacement is the displacement amount in the side direction at point J and point I. In FIG. 5, the horizontal axis is the vehicle speed (km/h) and the vertical axis is the side force/side displacement (N/mm) and the side force at point I/side force at point J, and in FIG. 6, the horizontal axis is the vehicle height (mm) and the vertical axis is the angle and $\gamma_J/\gamma_I$. The vehicle height is the difference with respect to the reference height.

As illustrated in FIG. 5, the side force/side displacement at point I and the side force/side displacement at point J change according to the vehicle speed. The side force at point I/side force at point J thus also change according to the vehicle speed. In the present embodiment, the side force at point I/side force at point J becomes greater as the vehicle speed becomes greater. Furthermore, as illustrated in FIG. 6, the angle $\gamma_I$ and the angle $\gamma_J$ change according to the vehicle height, and the angle $\gamma_J$/angle $\gamma_I$ also changes according to the vehicle height. Specifically, the value of the angle $\gamma_J$/angle $\gamma_I$ becomes smaller as the vehicle height becomes higher, that is, changes in the rebound direction (negative direction), and the value of the angle $\gamma_J$/angle $\gamma_I$ becomes greater as the vehicle height becomes lower, that is, changes in the bound direction (positive direction).

The relationship illustrated in FIG. 7 is obtained by calculating the relationship of the vehicle speed and the vehicle height based on the calculation results of equation 5 and FIG. 5 and FIG. 6. FIG. 7 is a graph illustrating a result of calculating the relationship of the vehicle height and the vehicle speed. In FIG. 7, the horizontal axis is the vehicle speed (km/h), and the vertical axis is the vehicle height (mm). The vehicle 1 can suppress the vibration in the side direction if traveling in a state in which the vehicle height and the vehicle speed satisfy the relationship illustrated in FIG. 7.

The control means 30 stores the relationship illustrated in FIG. 7 as a graph and a map, where an appropriate vehicle height is calculated from the vehicle speed detected by the vehicle speed detecting sensor 42 and the stored relationship, and the air pressure to supply from the air compressor 35 and the opening/closing of the valves V1, V2, V3, V4 are switched to control the suspensions 31, 32, 33, 34 so as to become the calculated vehicle height.

By way of example, the vehicle control device 10 lowers the vehicle height when detecting that the vehicle speed is rising as a result of the detection with the vehicle speed detecting sensor 42. That is, if the speed is higher than the vehicle speed of when the condition is detected immediately before, an appropriate vehicle height is calculated from the map in correspondence with such speed change, and the vehicle height is assumed as the calculated vehicle height. Therefore, the vehicle control device 10 lowers the vehicle height as the speed becomes faster and heightens the vehicle height as the speed becomes slower based on the relationship illustrated in FIG. 7. The vehicle control device 10 may carry out the adjustment of the vehicle height based on the detection result of the vehicle speed detecting sensor 42 at a constant time interval, on a steady basis, or when the vehicle speed is changed by a constant amount or more.

Therefore, the vehicle 1 can be made to an appropriate vehicle height, the vibration in the side direction can be suppressed, and a so-called throbbing vibration in the side direction can be reduced. The ride comfort of the vehicle can be made more comfortable as the throbbing vibration can be suppressed.

Figure 8:
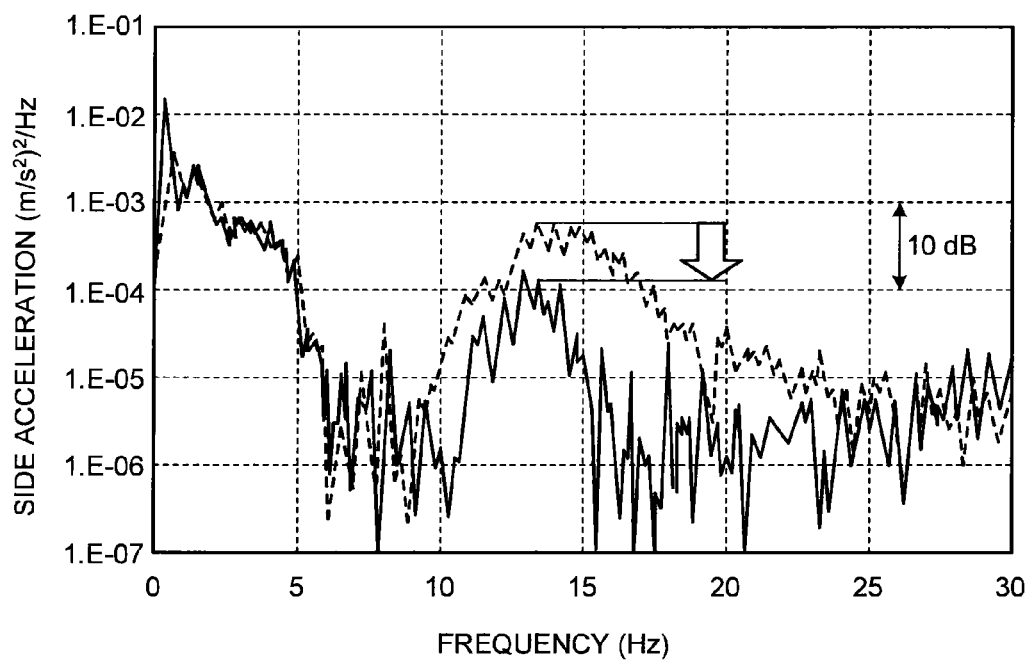
FIG. 8 is a graph illustrating a result of measuring the relationship of the vehicle height and the vibration.

FIG. 8 is a graph illustrating a result of measuring the relationship of the vehicle height and the vibration. In FIG. 8, the horizontal axis is the frequency (Hz), and the vertical axis is the side acceleration $((m/s^2)^2/Hz)$. In the graph of FIG. 8, the calculation result in which the vibration is measured for two different vehicle heights, and the vibration is frequency analyzed is illustrated. The two different vehicle heights are the vehicle height of when the vehicle height is controlled by the vehicle control device 10 of the present embodiment, and the vehicle height of when the vehicle height is not controlled. As illustrated with a graph in FIG. 8, the vehicle 1 can reduce the acceleration in the side direction by about 10 dB as the magnitude of the vibration is greatly changed by the vehicle height and the appropriate vehicle height can be realized. In the embodiment described above, the vehicle height is adjusted based on the vehicle speed, but is not limited thereto, and the vehicle height may be adjusted based on other parameters configuring equation 5.

The vehicle control device 10 preferably includes a vehicle height sensor for detecting the vehicle height, so that how many centimeters the vehicle height is, whether the vehicle height is the set vehicle height, and the like can be detected and the vehicle height can be adjusted based on such detection result. The vehicle height can be more appropriately controlled by arranging the vehicle height sensor and adjusting the vehicle height based on the detection result.

In the embodiment described above, a mechanism of changing the height of the suspension with air pressure to adjust the vehicle height is adopted, but is not limited thereto. A device adapted to change the height of the suspension by hydraulic pressure may be adopted. Furthermore, a mechanism for adjusting the vehicle height with the mechanism other than the suspension may be used.

Second Embodiment

Figure 9:
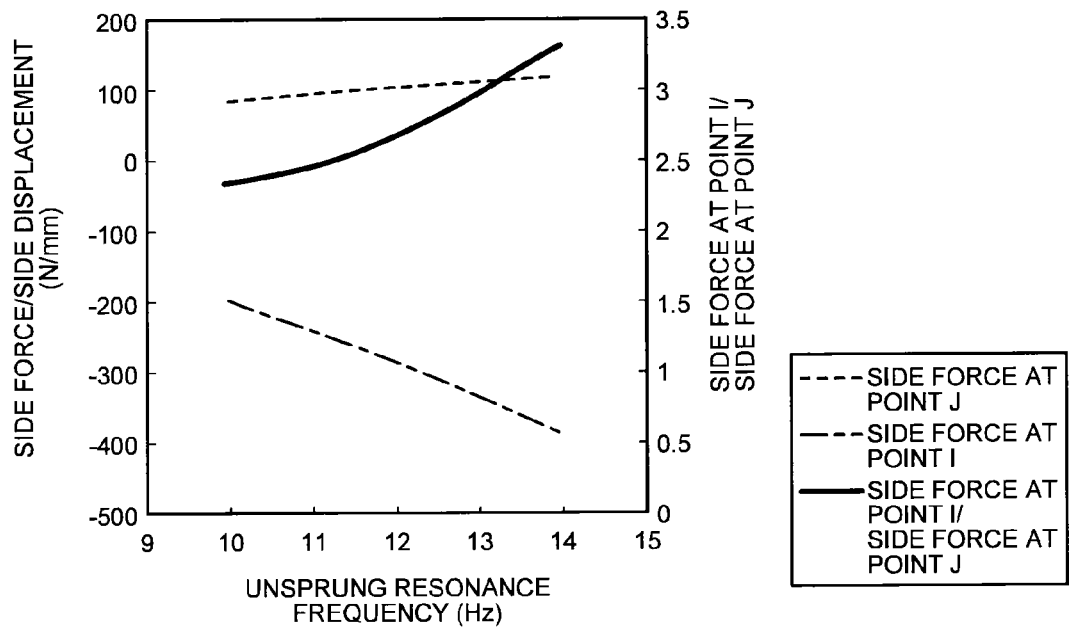
FIG. 9 is a graph illustrating a relationship of the force acting in the side direction and the unsprung resonance frequency in the vertical direction.
Figure 10:
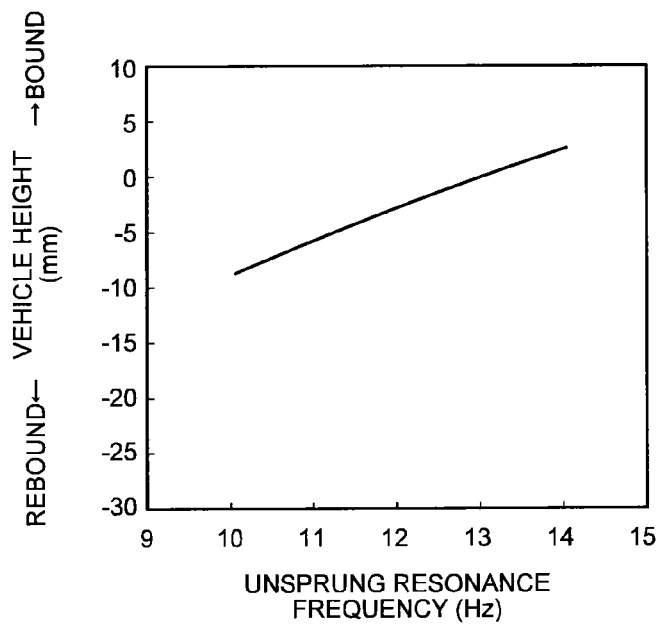
FIG. 10 is a graph illustrating a result of calculating the relationship of the vehicle height and the unsprung resonance frequency in the vertical direction.

Second embodiment will now be described using FIG. 9 and FIG. 10. The second embodiment is an example in which the vehicle height is adjusted based on the measurement result of the unsprung resonance frequency. FIG. 9 is a graph illustrating a relationship of the force acting in the side direction and the unsprung resonance frequency in the vertical direction, and FIG. 10 is a graph illustrating a result of calculating the relationship of the vehicle height and the unsprung resonance frequency in the vertical direction. In FIG. 9, the horizontal axis is the unsprung resonance frequency (Hz), and the vertical axis is the side force/side displacement (N/mm) and the side force at point I/side force at point J, and in FIG. 10, the horizontal axis is the unsprung resonance frequency (Hz) and the vertical axis is the vehicle height (mm).

As illustrated in FIG. 9, the side force/side displacement at point I and the side force/side displacement at point J also change by the unsprung resonance frequency. The side force at point I/side force at point J thus also change by the unsprung resonance frequency. In the present embodiment, the side force at point I/side force at point J also becomes greater as the unsprung resonance frequency becomes greater.

The relationship illustrated in FIG. 10 is obtained by calculating the relationship of the unsprung resonance frequency and the vehicle height based on the calculation results of equation 5 and FIG. 9 and FIG. 6 described above. The vehicle 1 can suppress the vibration in the side direction if traveling in a state in which the vehicle height and the unsprung resonance frequency satisfy the relationship illustrated in FIG. 10.

In the present embodiment, the control means 30 stores the relationship illustrated in FIG. 10 as a graph and a map, where an appropriate vehicle height is calculated from the unsprung resonance frequency calculated based on the detection result of the resolver and the stored relationship, and the air pressure to supply from the air compressor 35 and the opening/closing of the valves V1, V2, V3, V4 are switched to control the suspensions 31, 32, 33, 34 so as to become the calculated vehicle height.

By way of example, the vehicle control device 10 lowers the vehicle height when detecting that the unsprung resonance frequency is rising. That is, if the frequency is higher than the unsprung resonance frequency of when the condition is detected immediately before, an appropriate vehicle height is calculated from the map in correspondence with such frequency change, and the vehicle height is assumed as the calculated vehicle height. Therefore, the vehicle control device 10 lowers the vehicle height as the unsprung resonance frequency becomes greater and heightens the vehicle height as the unsprung resonance frequency becomes smaller based on the relationship illustrated in FIG. 10. The vehicle control device 10 may carry out the adjustment of the vehicle height based on the detection result of the unsprung resonance frequency at a constant time interval, on a steady basis, or when the unsprung resonance frequency is changed by a constant amount or more.

Therefore, the vehicle 1 can be made to an appropriate vehicle height, the vibration in the side direction can be suppressed, and a so-called throbbing vibration in the side direction can be reduced by adjusting the vehicle height based on the detection result of the unsprung resonance frequency. The ride comfort of the vehicle can be made more comfortable as the throbbing vibration can be suppressed.

The detection method of the unsprung resonance frequency is not limited to the present embodiment, and may be detected from the measurement result other than the wheel speed detected with the resolver. For instance, a sensor for directly detecting the unsprung vibration may be arranged, and the unsprung resonance frequency may be detected from the detection result. Furthermore, conditions (tire pressure, elastic force of suspension, etc.) that influence the unsprung resonance frequency may be detected, and the unsprung resonance frequency may be detected based on such conditions.

Third Embodiment

Figure 11:
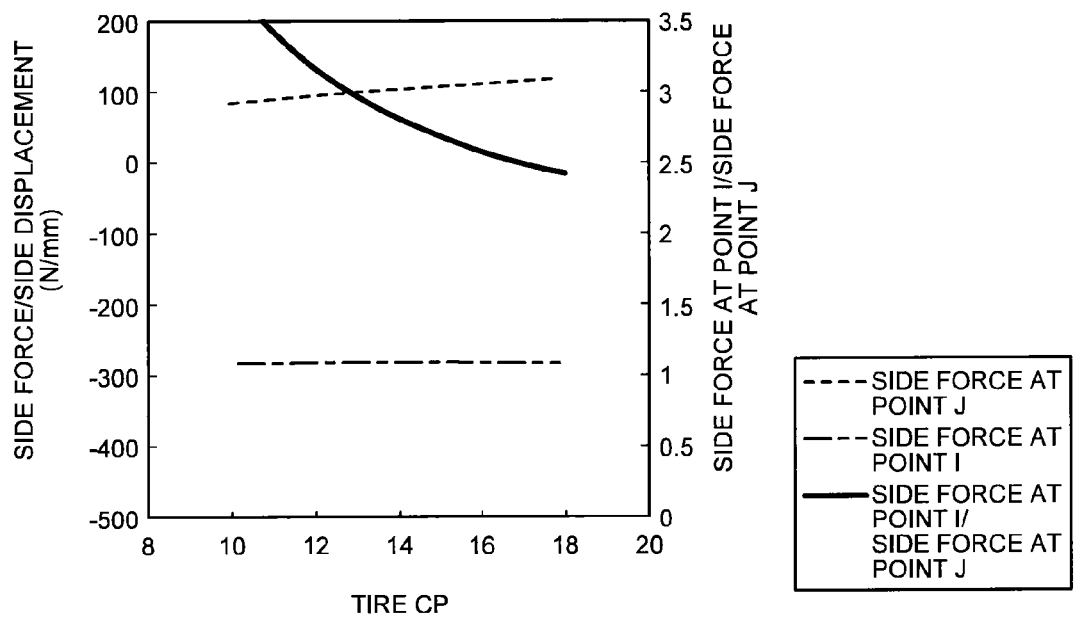
FIG. 11 is a graph illustrating a relationship of the force acting in the side direction and the tire cornering power.
Figure 12:
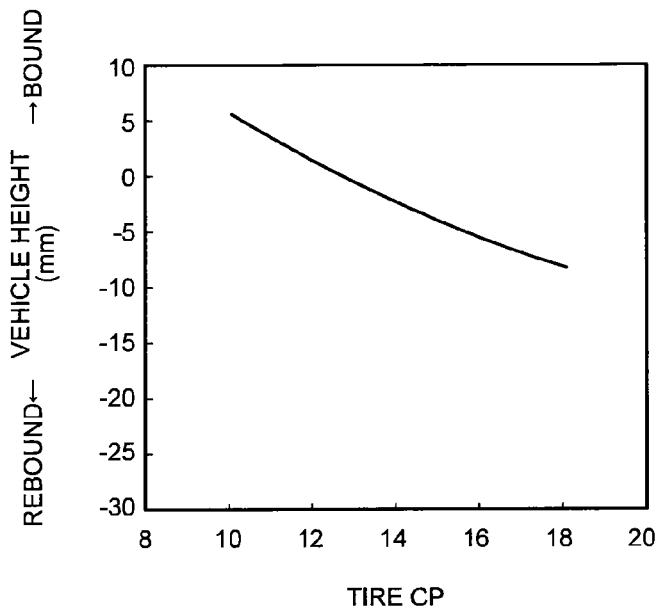
FIG. 12 is a graph illustrating a result of calculating the relationship of the vehicle height and the tire cornering power.

Third embodiment will now be described using FIG. 11 and FIG. 12. The third embodiment is an example in which the vehicle height is adjusted based on the measurement result of the tire cornering power (hereinafter also referred to as "tire CP"). FIG. 11 is a graph illustrating a relationship of the force acting in the side direction and the tire cornering power, and FIG. 12 is a graph illustrating a result of calculating the relationship of the vehicle height and the tire cornering power. In FIG. 11, the horizontal axis is the tire CP and the vertical axis is the side force/side displacement (N/mm) and side force at point I/side force at point J, and in FIG. 10, the horizontal axis is the tire CP and the vertical axis is the vehicle height (mm).

As illustrated in FIG. 11, the side force/side displacement at point I and the side force/side displacement at point J also change by the tire CP. The side force at point I/side force at point J thus also change by the tire CP. In the present embodiment, the side force at point I/side force at point J becomes smaller as the tire CP becomes greater.

The relationship illustrated in FIG. 12 is obtained by calculating the relationship of the tire CP and the vehicle height based on the calculation results of equation 5 and FIG. 11 and FIG. 6 described above. The vehicle 1 can suppress the vibration in the side direction if traveling in a state in which the vehicle height and the tire CP satisfy the relationship illustrated in FIG. 12.

In the present embodiment, the control means 30 stores the relationship illustrated in FIG. 12 as a graph and a map, where the tire CP is calculated from the road surface state detected with the road surface state detecting sensor, an appropriate vehicle height is calculated from the calculation result and the stored relationship, and the air pressure to supply from the air compressor 35 and the opening/closing of the valves V1, V2, V3, V4 are switched to control the suspensions 31, 32, 33, 34 so as to become the calculated vehicle height.

By way of example, the vehicle control device 10 heightens the vehicle height when detecting that the tire CP is rising. That is, if the tire CP is higher than the tire CP of when the condition is detected immediately before, an appropriate vehicle height is calculated from the map in correspondence with the change in the tire CP, and the vehicle height is assumed as the calculated vehicle height. Therefore, the vehicle control device 10 heightens the vehicle height as the tire CP becomes greater and lowers the vehicle height as the tire CP becomes smaller based on the relationship illustrated in FIG. 12. The vehicle control device 10 may carry out the adjustment of the vehicle height based on the detection result of the tire CP at a constant time interval, on a steady basis, or when the tire CP is changed by a constant amount or more.

Therefore, the vehicle 1 can be made to an appropriate vehicle height, the vibration in the side direction can be suppressed, and a so-called throbbing vibration in the side direction can be reduced by adjusting the vehicle height based on the detection result of the tire CP. The ride comfort of the vehicle can be made more comfortable as the throbbing vibration can be suppressed.

If it is only whether the road surface state is wet or not, the tire CP corresponding to the respective detection result may be set in advance, and the adjustment may be made to the vehicle height calculated based on such tire CP. The control of the vehicle height is not limited to being linearly changed in correspondence with the detection result. For instance, the value of the vehicle height may be set for every constant range of the numerical value of the detection result. That is, the vehicle height may be adjusted in a stepwise manner.

Fourth Embodiment

Fourth embodiment will now be described using FIG. 13 to FIG. 15. In the first embodiment, the vehicle height is adjusted based on the measurement result of the vehicle speed, but in the present embodiment, the steering gear ratio is adjusted based on the measurement result of the vehicle speed.

The relationship between the steering gear ratio and the cornering power can be expressed as equation 6. In equation 6, N is the steering gear ratio, P is the cornering power, $P_0$ is the cornering power of the tire single body, $K_\theta$ is the torsional stiffness of the steering and L is the sum of the caster trail and the pneumatic trail.

$$\frac{1}{P} = \frac{1}{P_0} + \frac{2L}{K_\theta N^2} \quad (6)$$

As shown in equation 6, the resistance of the portion coupled to the tire for steering changes by changing the steering gear ratio. The tire cornering power also changes according to such change. Equation 6 may be substituted to equation 3 to obtain equation 7.

$$\gamma_{I0} m \omega^2 = \gamma_{J0} \frac{\left(\frac{\omega}{\left(\frac{1}{P_0} + \frac{2L}{K_\theta N^2}\right)U}\right)^2}{K^2 + \left(\frac{\omega}{\left(\frac{1}{P_0} + \frac{2L}{K_\theta N^2}\right)U}\right)^2} K \quad (7)$$

Equation 7 is further developed so that the left side is only $N^2$, which becomes equation 8.

$$N^2 = \frac{2L}{K_\theta} \Bigg/ \left(\frac{1}{U}\sqrt{\frac{\gamma_{J0}K - \gamma_{I0}m\omega^2}{\gamma_{I0}mK^2}} - \frac{1}{P_0}\right) \quad (8)$$

The vehicle control device 10 of the present embodiment controls the steering gear ratio to satisfy equation 8 based on the detection result. This will be specifically described using FIG. 13 to FIG. 15. FIG. 13 is a graph illustrating a relationship of the force acting in the side direction and the vehicle speed, FIG. 14 is a graph illustrating a relationship of the angle and the steering gear ratio, and FIG. 15 is a graph illustrating a result of calculating the relationship of the steering gear ratio and the vehicle speed. FIG. 13 to FIG. 15 show relationships derived in advance through experiment, measurement, and calculation. In FIG. 13, the horizontal axis is the vehicle speed (km/h) and the vertical axis is the side force/side displacement (N/mm) and the ideal CP gain, in FIG. 14, the horizontal axis is the steering gear ratio and the vertical axis is the CP gain. In FIG. 15, the horizontal axis is the vehicle speed (km/h) and the vertical axis is the steering gear ratio.

Figure 13:
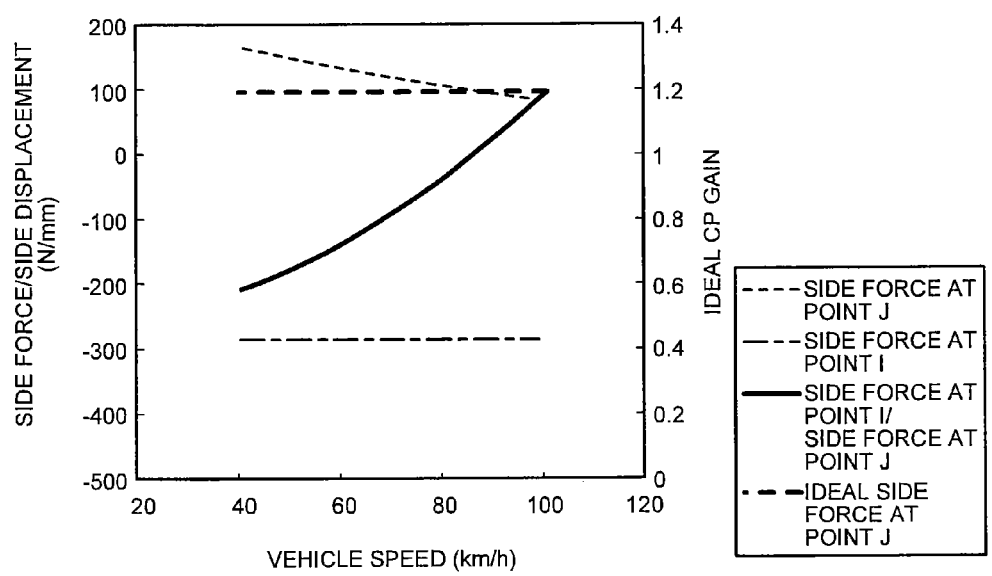
FIG. 13 is a graph illustrating a relationship of the force acting in the side direction and the vehicle speed.

As illustrated in FIG. 13, the side force/side displacement at point I and the side force/side displacement at point J change according to the vehicle speed. The ideal side force/side displacement at point J also changes according to the vehicle speed. The ideal CP gain thus also changes according to the vehicle speed. The ideal CP gain is the CP gain at which the vibration in the side direction can be appropriately suppressed. In the present embodiment, the ideal CP gain becomes greater as the vehicle speed becomes greater. As illustrated in FIG. 14, the CP gain changes by the steering gear ratio. Specifically, the CP gain becomes greater as the steering gear ratio becomes greater, and the CP gain becomes smaller as the steering gear ratio becomes smaller.

Figure 14:
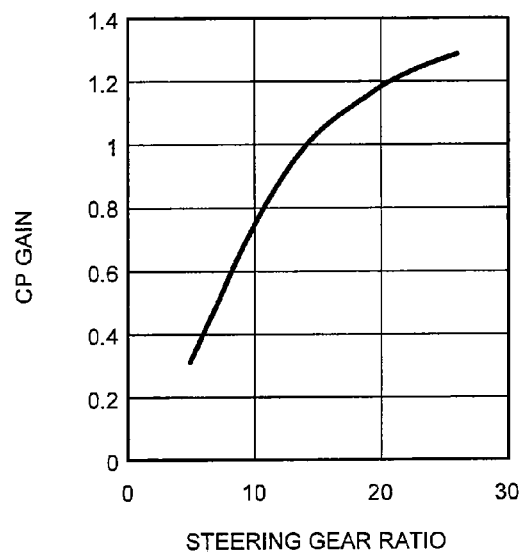
FIG. 14 is a graph illustrating a relationship of the angle and the steering gear ratio.
Figure 15:
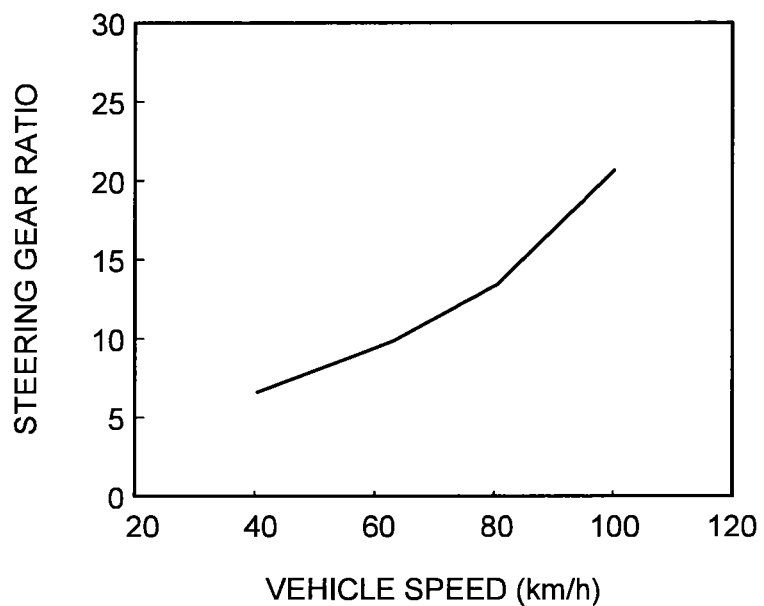
FIG. 15 is a graph illustrating a result of calculating the relationship of the steering gear ratio and the vehicle speed.

The relationship illustrated in FIG. 15 is obtained by calculating the relationship of the vehicle speed and the steering gear ratio based on the calculation results of equation 8 and FIG. 13 and FIG. 14. The vehicle 1 can suppress the vibration in the side direction if traveling in a state in which the steering gear ratio and the vehicle speed satisfy the relationship illustrated in FIG. 15.

The control means 30 stores the relationship illustrated in FIG. 15 as a graph and a map, where an appropriate steering gear ratio is calculated from the vehicle speed detected by the vehicle speed detecting sensor 42 and the stored relationship and the steering gear ratio is adjusted by the gear ratio adjusting means 36 so as to become the calculated gear ratio.

By way of example, the vehicle control device 10 increases the steering gear ratio when detecting that the vehicle speed is rising as a result of the detection with the vehicle speed detecting sensor 42. That is, if the speed is higher than the vehicle speed of when the condition is detected immediately before, an appropriate steering gear ratio is calculated from the map in correspondence with such speed change, and the steering gear ratio is assumed as the calculated steering gear ratio. Therefore, the vehicle control device 10 increases the steering gear ratio as the speed becomes faster and lowers the steering gear ratio as the speed becomes slower based on the relationship illustrated in FIG. 15. The vehicle control device 10 may carry out the adjustment of the steering gear ratio based on the detection result of the vehicle speed detecting sensor 42 at a constant time interval, on a steady basis, or when the vehicle speed is changed by a constant amount or more.

Therefore, the vehicle 1 can be made to an appropriate steering gear ratio, and the tire cornering power can be made appropriate. As the tire cornering power can be made appropriate, the relationship of equation 7 can be satisfied, the force acting in the side direction can be canceled out, the vibration in the side direction can be suppressed, and a so-called throbbing vibration in the side direction can be reduced. The ride comfort of the vehicle can be made more comfortable as the throbbing vibration can be suppressed.

Fifth Embodiment

Figure 16:
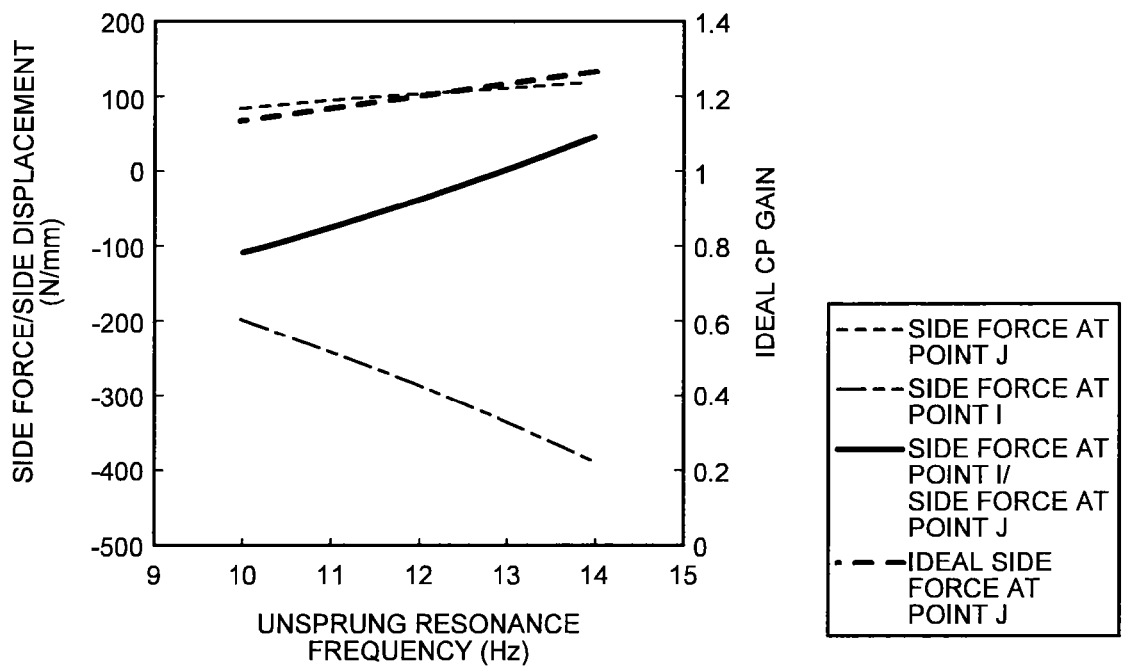
FIG. 16 is a graph illustrating a relationship of the force acting in the side direction and the unsprung resonance frequency in the vertical direction.
Figure 17:
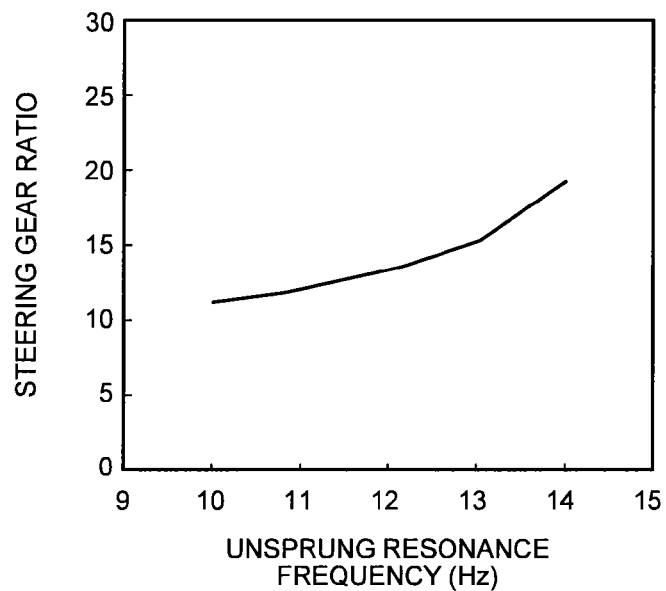
FIG. 17 is a graph illustrating a result of calculating the relationship of the steering gear ratio and the unsprung resonance frequency in the vertical direction.

Fifth embodiment will be described using FIG. 16 and FIG. 17. The fifth embodiment is an example in which the steering gear ratio is adjusted based on the measurement result of the unsprung resonance frequency. FIG. 16 is a graph illustrating a relationship of the force acting in the side direction and the unsprung resonance frequency in the vertical direction, and FIG. 17 is a graph illustrating a result of calculating the relationship of the steering gear ratio and the unsprung resonance frequency in the vertical direction. In FIG. 16, the horizontal axis is the unsprung resonance frequency (Hz), and the vertical axis is the side force/side displacement (N/mm) and the ideal CP gain, and in FIG. 17, the horizontal axis is the unsprung resonance frequency (Hz) and the vertical axis is the steering gear ratio.

As illustrated in FIG. 16, the side force/side displacement at point I, the side force/side displacement at point J, and the ideal side force/side displacement at point J change by the unsprung resonance frequency. The ideal CP gain thus also changes by the unsprung resonance frequency. In the present embodiment, the ideal CP gain becomes greater as the unsprung resonance frequency becomes greater.

The relationship illustrated in FIG. 17 is obtained by calculating the relationship of the unsprung resonance frequency and the steering gear ratio based on the calculation results of equation 8 and FIG. 16 and FIG. 14 described above. The vehicle 1 can suppress the vibration in the side direction if traveling in a state in which the steering gear ratio and the unsprung resonance frequency satisfy the relationship illustrated in FIG. 17.

In the present embodiment, the control means 30 stores the relationship illustrated in FIG. 17 as a graph and a map, where an appropriate steering gear ratio is calculated from the unsprung resonance frequency calculated based on the detection result of the resolver and the stored relationship, and adjusted by the gear ratio adjusting means 36 so as to become the calculated steering gear ratio.

By way of example, the vehicle control device 10 increases the steering gear ratio when detecting that the unsprung resonance frequency is rising. That is, if the frequency is higher than the unsprung resonance frequency of when the condition is detected immediately before, an appropriate steering gear ratio is calculated from the map in correspondence with such frequency change, and the steering gear ratio is assumed as the calculated steering gear ratio. Therefore, the vehicle control device 10 increases the steering gear ratio as the unsprung resonance frequency becomes greater and lowers the steering gear ratio as the unsprung resonance frequency becomes smaller based on the relationship illustrated in FIG. 17. The vehicle control device 10 may carry out the adjustment of the steering gear ratio based on the detection result of the unsprung resonance frequency at a constant time interval, on a steady basis, or when the unsprung resonance frequency is changed by a constant amount or more.

Therefore, the vehicle 1 can be made to an appropriate steering gear ratio, the vibration in the side direction can be suppressed, and a so-called throbbing vibration in the side direction can be reduced by adjusting the steering gear ratio based on the detection result of the unsprung resonance frequency. The ride comfort of the vehicle can be made more comfortable as the throbbing vibration can be suppressed.

Sixth Embodiment

Figure 18:
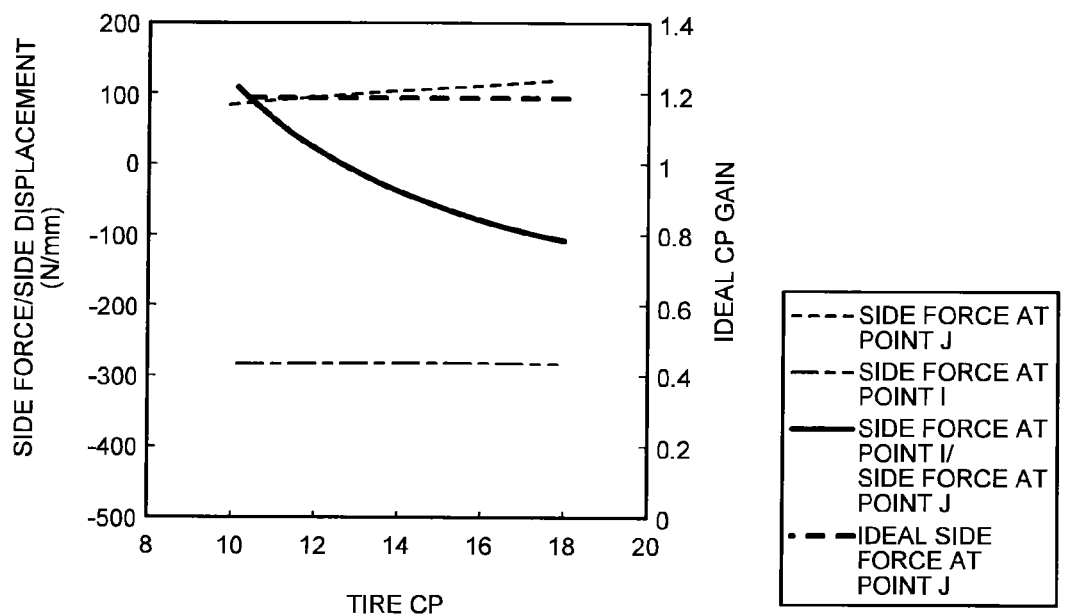
FIG. 18 is a graph illustrating a relationship of the force acting in the side direction and the tire cornering power.
Figure 19:
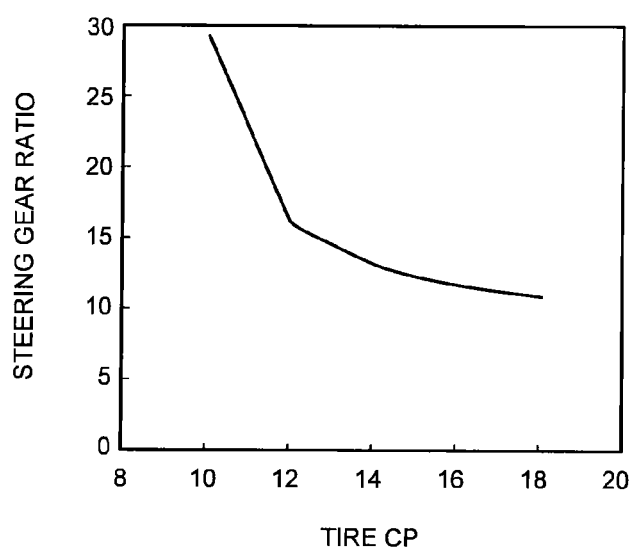
FIG. 19 is a graph illustrating a result of calculating the relationship of the steering gear ratio and the tire cornering power.

Sixth embodiment will be described using FIG. 18 and FIG. 19. The sixth embodiment is an example in which the steering gear ratio is adjusted based on the measurement result of the tire cornering power. FIG. 18 is a graph illustrating a relationship of the force acting in the side direction and the tire cornering power, and FIG. 19 is a graph illustrating a result of calculating the relationship of the steering gear ratio and the tire cornering power. In FIG. 18, the horizontal axis is the tire cornering power and the vertical axis is the side force/side displacement (N/mm) and the ideal CP gain, and in FIG. 19, the horizontal axis is the tire cornering power and the vertical axis is the steering gear ratio. The tire cornering power on the horizontal axis of FIG. 18 and FIG. 19 is the cornering power of the tire single body of equation 6 described above.

As illustrated in FIG. 18, the side force/side displacement at point I, the side force/side displacement at point J, and the ideal side force/side displacement at point J also change by the tire cornering power. The ideal CP gain thus also changes by the tire cornering power. In the present embodiment, the ideal CP gain becomes smaller as the tire cornering power becomes greater.

The relationship illustrated in FIG. 19 is obtained by calculating the relationship of the tire cornering power and the steering gear ratio based on the calculation results of equation 8 and FIG. 18 and FIG. 14 described above. The vehicle 1 can suppress the vibration in the side direction if traveling in a state in which the steering gear ratio and the tire cornering power satisfy the relationship illustrated in FIG. 19.

In the present embodiment, the control means 30 stores the relationship illustrated in FIG. 19 as a graph and a map, where the tire CP is calculated from the road surface state detected with the road surface state detecting sensor, and an appropriate steering gear ratio is calculated from the calculation result and the stored relationship and adjusted by the gear ratio adjusting means 36 so as to become the calculated steering gear ratio.

By way of example, the vehicle control device 10 lowers the steering gear ratio when detecting that the tire CP is rising. That is, if the tire CP is higher than the tire CP of when the condition is detected immediately before, an appropriate steering gear ratio is calculated from the map in correspondence with the change in the tire CP, and the steering gear ratio is assumed as the calculated steering gear ratio. Therefore, the vehicle control device 10 lowers the steering gear ratio as the tire CP becomes greater and increases the steering gear ratio as the tire CP becomes smaller based on the relationship illustrated in FIG. 19. The vehicle control device 10 may carry out the adjustment of the steering gear ratio based on the detection result of the tire CP at a constant time interval, on a steady basis, or when the tire CP is changed by a constant amount or more.

Therefore, the vehicle 1 can be made to an appropriate steering gear ratio, the vibration in the side direction can be suppressed, and a so-called throbbing vibration in the side direction can be reduced by adjusting the steering gear ratio based on the detection result of the tire cornering power. The ride comfort of the vehicle can be made more comfortable as the throbbing vibration can be suppressed.

In all the embodiments described above, the vehicle height or the steering gear ratio is adjusted based on one parameter, but this is not the sole case. The vehicle height may be adjusted based on a plurality of parameters, and the steering gear ratio may be adjusted based on a plurality of parameters. For instance, the first embodiment to the third embodiment may be combined, or the fourth embodiment to the sixth embodiment may be combined. Furthermore, the parameter to detect (detection value) merely needs to be an operation condition that influences the side vibration of the vehicle body, and is not limited to the six embodiments described above.

In the embodiments described above, the vehicle height or the steering gear ratio is controlled, but this is not the sole case, and may be adjusted with a mechanism capable of adjusting to satisfy the relationship of equation 3, for example, an adjusting means for adjusting a suspension geometry of the vehicle. That is, as long as it is an adjusting means for changing the resonance frequency or the tire cornering power, it can be the control target. For instance, a mechanism for adjusting the air pressure of the tire and a mechanism for adjusting the elasticity of the suspension may be the control target, and the air pressure of the tire and the elasticity of the suspension may be adjusted by each mechanism to change the resonance frequency and the tire cornering power, so that the suspension geometry of the vehicle is in an appropriate state and the throbbing feeling can be suppressed.

INDUSTRIAL APPLICABILITY

As described above, the vehicle control device of the present invention is useful when used in vehicles such as an automobile, and is particularly suited for suppressing the vibration of the vehicle.

REFERENCE SIGNS LIST

1 VEHICLE
2, 3 TIRE
4 STEERING
5 ECU
9 VEHICLE BODY
10 VEHICLE CONTROL DEVICE
30 CONTROL MEANS
31, 32, 33, 34 SUSPENSION
35 AIR COMPRESSOR
36 STEERING GEAR RATIO ADJUSTING MEANS
42 VEHICLE SPEED DETECTING SENSOR
43 ROAD SURFACE STATE DETECTING SENSOR
40R, 40L, 41R, 41L RESOLVER
V1, V2, V3, V4 VALVE
60 CENTER OF GRAVITY
62 GROUND SURFACE

The invention claimed is:

1. A vehicle control device for controlling operation of a vehicle including a vehicle body, and a tire for supporting the vehicle body and contacting with a ground surface, the vehicle control device comprising:
an operation condition detecting unit configured to detect an operation condition that influences a side vibration of the vehicle body;
a suspension geometry adjusting unit configured to adjust a suspension geometry of the vehicle; and
a control unit configured to control operation of the suspension geometry adjusting unit to suppress vibration in a side direction of the vehicle body based on a detection result of the operation condition detecting unit; wherein
the control unit stores a condition of the suspension geometry of the vehicle that cancels out a force in the side direction applied on a center of gravity of the tire and a force in the side direction applied on a contact point with the ground surface of the tire for every operation condition; and
the operation of the suspension geometry adjusting unit is controlled to obtain the condition of the suspension geometry of the vehicle that cancels out the force in the side direction applied on the center of gravity of the tire and the force in the side direction applied on the contact point with the ground surface of the tire based on the detection result of the operation condition detecting unit.

2. The vehicle control device according to claim 1, wherein the suspension geometry adjusting unit is a vehicle height adjusting unit configured to adjust a height between the vehicle body and a tire.

3. The vehicle control device according to claim 2, wherein the control unit stores a relationship of a control amount of the suspension geometry calculated in advance and a detection result, and calculates the control amount based on the relationship and the detection result.

4. The vehicle control device according to claim 2, wherein the operation condition detecting unit is a unit configured to detect a vehicle speed.

5. The vehicle control device according to claim 2, wherein the operation condition detecting unit is a unit configured to detect an unsprung resonance frequency in a vertical direction.

6. The vehicle control device according to claim 1, wherein the control unit stores a relationship of a control amount of the suspension geometry calculated in advance and a detection result, and calculates the control amount based on the relationship and the detection result.

7. The vehicle control device according to claim 6, wherein the operation condition detecting unit is a unit configured to detect a vehicle speed.

8. The vehicle control device according to claim 6, wherein the operation condition detecting unit is a unit configured to detect an unsprung resonance frequency in a vertical direction.

9. The vehicle control device according to claim 1, wherein the operation condition detecting unit is a unit configured to detect a vehicle speed.

10. The vehicle control device according to claim 1, wherein the operation condition detecting unit is a unit configured to detect an unsprung resonance frequency in a vertical direction.

11. The vehicle control device according to claim 1, wherein the operation condition detecting unit is a unit configured to detect a state of a road surface on which to travel.

12. The vehicle control device according to claim 1, wherein the side vibration of the vehicle body is a vibration that occurs from a force acting on the tire from the road surface.

* * * * *